United States Patent [19]

Arbour et al.

[11] Patent Number: 5,221,541
[45] Date of Patent: Jun. 22, 1993

[54] EXTRUDER HEAD FOR ELASTOMERIC MATERIAL

[75] Inventors: Gaetan Arbour, Joliette; Gerardo P. Elia; Margaret N. Elia, both of Brossard, all of Canada; Leonard R. Holm, Hartville, Ohio; Gilles Lavallee, Joliette, Canada

[73] Assignee: Bridgestone/Firestone, Inc., Akron, Ohio

[21] Appl. No.: 757,742

[22] Filed: Sep. 11, 1991

[51] Int. Cl.$^5$ .............................. B29C 47/78
[52] U.S. Cl. .................. 425/188; 264/176.1; 425/192 R; 425/197; 425/378.1; 425/382.4; 425/461
[58] Field of Search .............. 264/176.1, 211.21; 425/144, 149, 170, 190, 192 R, 188, 197, 376.1, 378.1, 382.4, 461

[56] References Cited

U.S. PATENT DOCUMENTS

| | | | |
|---|---|---|---|
| 2,092,410 | 9/1937 | Wheeler | 425/382.4 |
| 2,245,608 | 6/1941 | Rogers | 425/461 |
| 2,728,943 | 1/1956 | Hertz et al. | 425/197 |
| 2,897,541 | 8/1959 | Orsini | 425/197 |
| 3,032,822 | 5/1962 | Maddock | 425/382.4 |
| 3,551,951 | 1/1971 | Schiesser | 425/382.4 |
| 3,570,062 | 3/1971 | Dukert et al. | 425/170 |
| 3,676,535 | 7/1972 | Juel | 425/192 R |
| 3,871,810 | 3/1975 | Geyer | 425/382.4 |
| 4,015,925 | 4/1977 | Heilmayr | 425/376.1 |
| 4,164,388 | 8/1979 | Inman et al. | 425/378.1 |
| 4,238,538 | 12/1980 | Manwiller | 425/461 |
| 4,280,801 | 7/1981 | Wheeler, Jr. et al. | 425/382.4 |
| 4,826,422 | 5/1989 | Hunter | 425/382.4 |
| 4,892,473 | 1/1990 | Elia et al. | 425/197 |

FOREIGN PATENT DOCUMENTS

| | | | |
|---|---|---|---|
| 588555 | 11/1933 | Fed. Rep. of Germany | 425/382.4 |
| 3503721 | 8/1986 | Fed. Rep. of Germany | 425/461 |
| 437891 | 4/1949 | Italy | 425/382.4 |
| 172210 | 6/1965 | U.S.S.R. | 425/376.1 |
| 835802 | 6/1981 | U.S.S.R. | 425/461 |
| 520744 | 7/1984 | U.S.S.R. | 425/197 |

Primary Examiner—Scott Bushey
Attorney, Agent, or Firm—David A. Thomas

[57] ABSTRACT

An extruder head made up of several segments including a first section made up of at least two plates bolted together. At least one plate is hingeably mounted to another plate in the first section to provide access to an extrudate passage defined by the plates. Downstream of the first section is a pair of mating blocks bolted to the first section further defining the extrudate passage. Inserts of hardened steel are provided and held by the plates and blocks forming the extruder head and the inserts define parts of the extrudate passage. A cooling liquid chamber is provided in at least one insert to cool the wall forming the passage. Although the passage is continuously restricted in the downstream direction, to increase the pressure of the elastomeric melt, intermittent portions of a slightly greater cross-sectional area are provided to allow expansion and thus intermittent lower pressure of the melt as it passes through the passage.

5 Claims, 5 Drawing Sheets

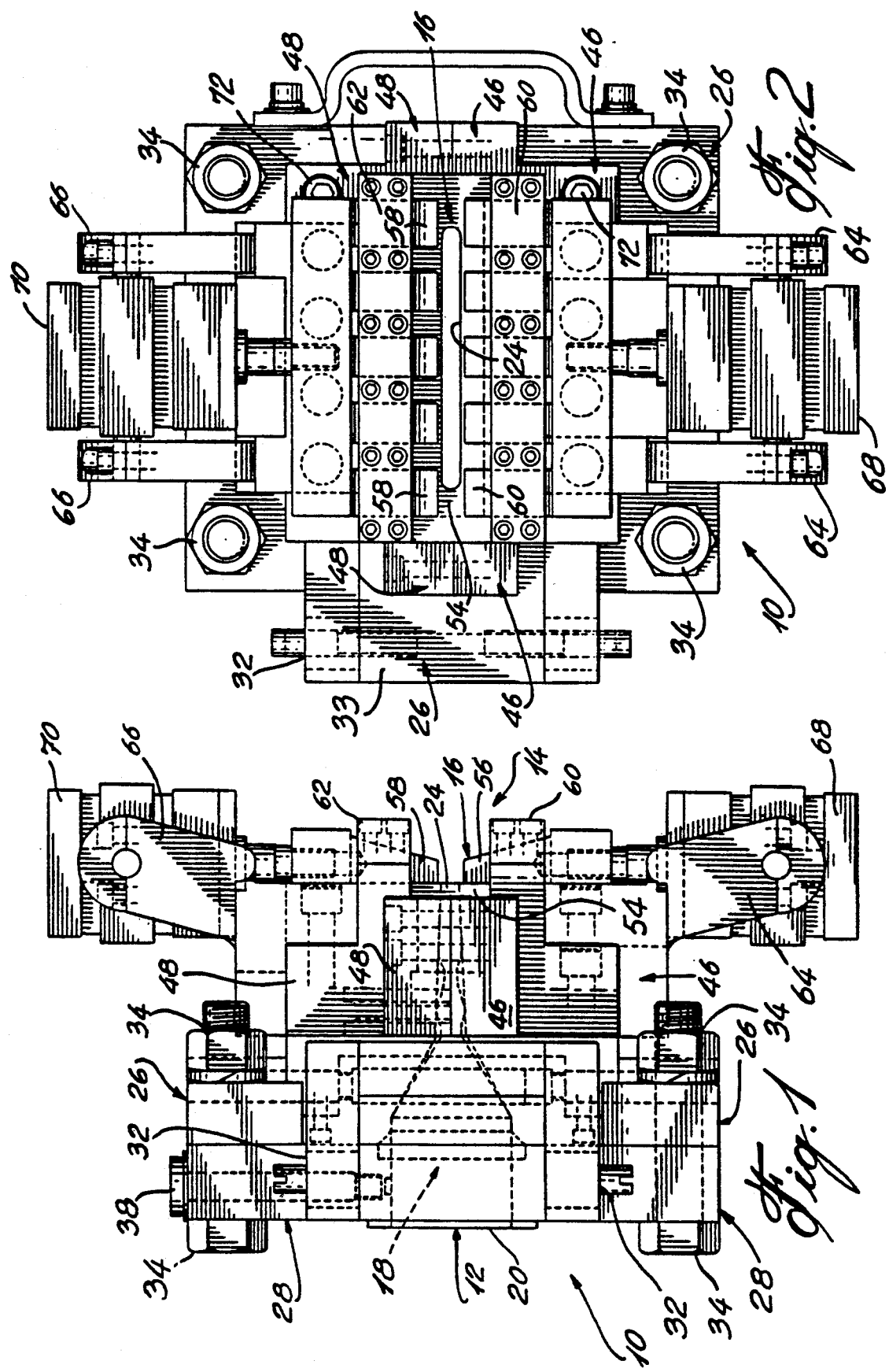

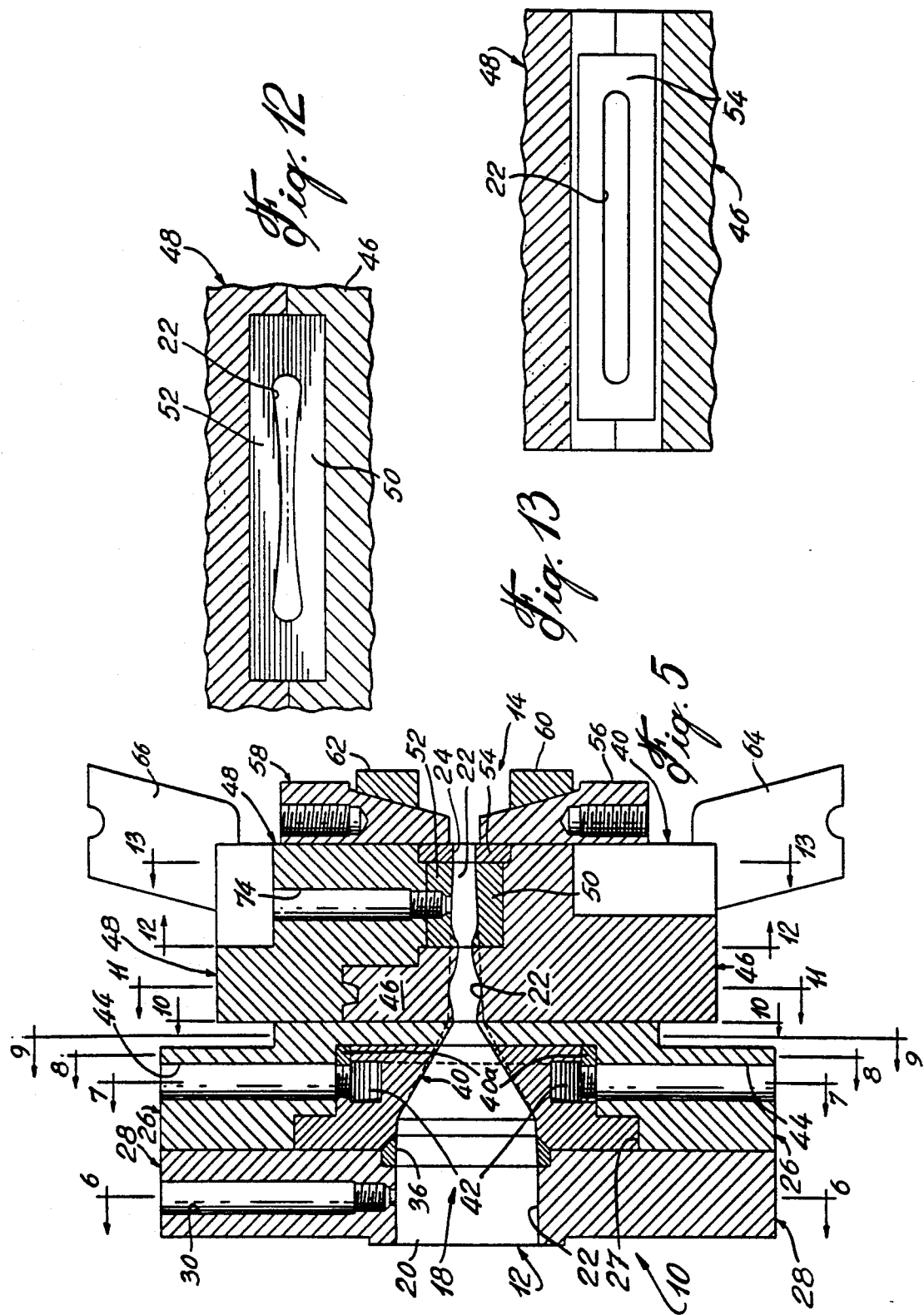

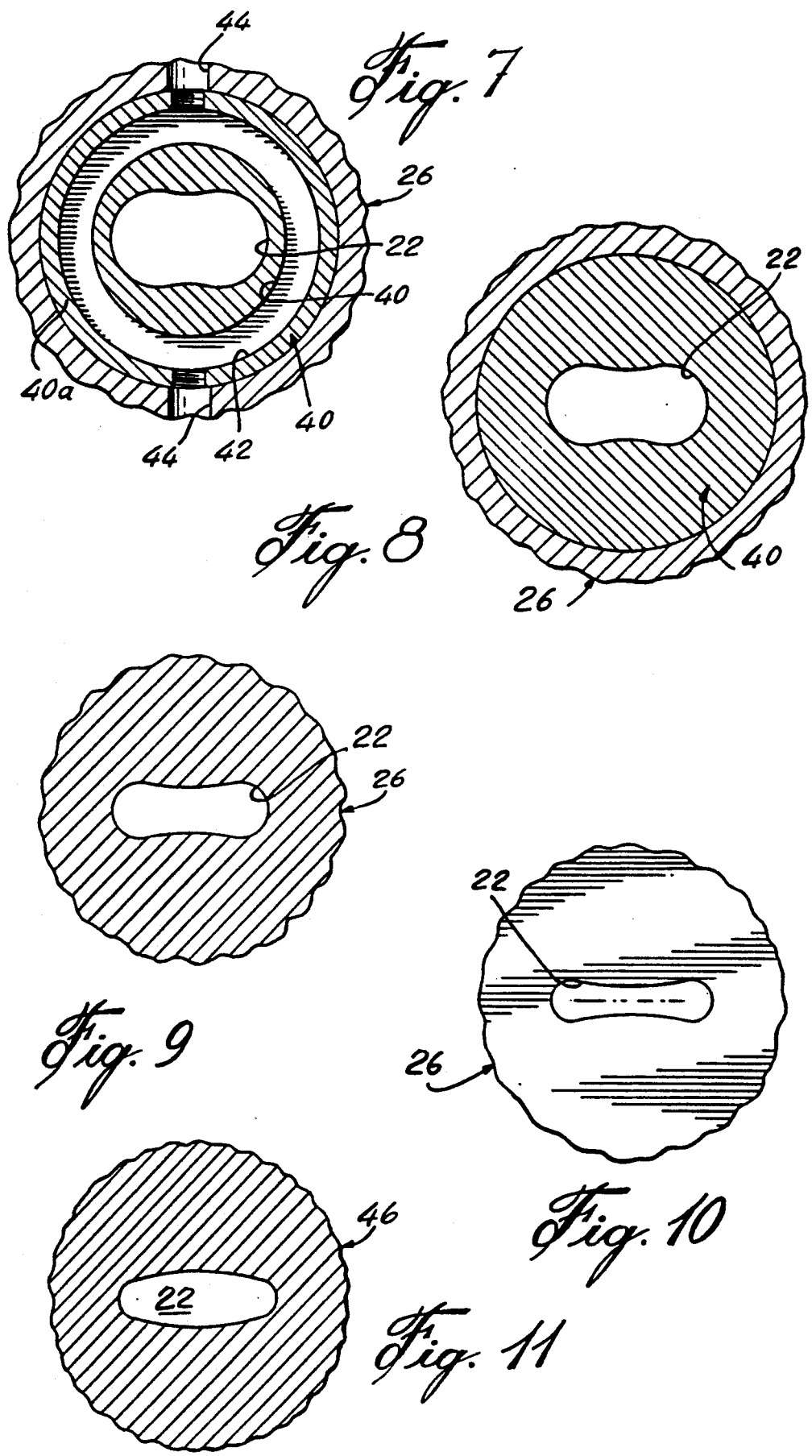

EXTRUDER HEAD FOR ELASTOMERIC MATERIAL

BACKGROUND OF THE INVENTION

1. Field of the Invention

The present invention relates to an extruder for elastomeric material, and more particularly, to an extruder head for producing tire components.

2. Description of the Prior Art

There has been much development in extruder heads for thermoplastic resins and the like. However, elastomeric materials, such as rubber, are not easily extruded through conventional extruder heads. It must be noted that elastomeric materials must be processed at relatively high pressures, notably in the range of 1,000 to 10,000 p.s.i., compared to thermoplastic materials, and the temperature of the molten mass of elastomeric material must be controlled in a relatively narrow range of 210° to 236° F., for instance.

Thus, the extruder heads of the prior art for use with elastomeric materials are typically of heavy duty construction. Furthermore, in order to provide temperature control, cooling chambers and passages must be provided in the head. Various developments have been made in order to provide the necessary high pressure application and temperature control. An example of such developments is illustrated in U.S. Pat. No. 3,871,810, issued Mar. 18, 1975, and assigned to Uniroyal, Inc. In this patent, a driven roller forms a pressure chamber with the stationary portion of the head. The roller also includes the cooling passages.

Such extruder heads as well as other cast heads available in the tire making industry, compared to those available for extruding thermoplastic resin, are, as can be seen, cumbersome, difficult and expensive to construct and not easy to maintain.

SUMMARY OF THE INVENTION

It is an aim of the present invention to provide a new extruder head for extruding elastomeric material and, in particular, rubber strips for tire treads, etc.

It is a further aim of the present invention to provide an extruder head for elastomeric material which is made of lightweight construction, yet can resist the relatively high pressures normally encountered in extruder heads for elastomeric materials.

It is a further aim to provide an extruder head for elastomeric material wherein the elements making up the pressure chamber and orifice or die are separable and can be individually machined in order to fine-tune the shape thereof to provide for the best extrusion flow characteristics of the elastomeric tire strip.

An extruder head for an elastomeric extruder in accordance with the present invention comprises an assembly of metal segments bolted together to form an extruder block defining a transition pressure chamber and an extrusion die. The assembly of metal segments includes a portion which defines a continuous cooling water chamber surrounding the transition pressure chamber. The transitional pressure chamber has an elongated passage portion of continuously changing cross-section such that the cross-sectional outline thereof changes from a somewhat circular cylindrical cross-section at an upstream end of the passage to a cross-sectional area having a horizontally extending flattened oval outline at the downstream end thereof with at least portions between the upstream and downstream ends which have a gradually decreasing cross-sectional area interrupted by portions which have a cross-sectional area greater than the immediately upstream portions, whereby the elastomeric melt, as it is being extruded through the transitional pressure chamber, will be continuously contracted through the gradually constricting passage interrupted by portions in the passage which allow the elastomeric melt to expand slightly.

In another aspect of the present invention, the block forming the extruding head includes a first section containing a series of segments in the form of at least two plates extending at right angles to the axis of a central extrudate passage defined by the plates and bolts extending through the plates to fix the plates together. A second section includes an extrudate passage forming member defining an axial portion of the extrudate passage and including a tubular insert member and a flange formed at one end of the tube wherein the flange can be retained between the plates of the first section to maintain the tubular member concentric with the axis of the extrudate passage. Channels for a cooling liquid are provided in the tubular insert member and communicate with conduits in at least one of the two plates in the first section and to a source of cooling liquid to cool the wall of the tubular member forming the extrudate passage. A third section includes at least a pair of block members mated together and bolted to the first section and defining a bore co-extensive with the axis of the extrudate passage. A tubular insert is provided in at least a portion of the bore to form an extension of the extrudate passage downstream of the first section. A movable die assembly is bolted to the third section.

In a more specific embodiment of the present invention, one of the plates of the first section is hingedly mounted to the other plate, and a filter seat is defined therein such that, when the filter retaining plate is closed against the other plate, it defines an opening in the same axis as the extrudate passage and provides for retaining an extrudate filter in the path of the extrudate.

The advantages of the present invention include, in the latter construction, the provision of removable and replaceable extrudate passage forming inserts such as the second section and the downstream insert which can be adjusted to fine-tune the extrudate flow of the elastomeric mass. The inserts could be of a harder material than the remainder of the extruder head in order to resist the high pressure and friction of the extrusion process while using a lighter construction for the remainder of the head in order to maintain a lighter extruder head construction. The extruder head is easier to maintain, such as for replacing filters, etc.

As far as the extrusion passage is concerned, the elastomeric melt or extrudate material is forced through the pressure transition chamber portion of the passage and because of the gradually constricting passage, the pressure and resulting temperature are increased considerably. The cooling liquid passing through the cooling chamber will help to control the temperature. By intermittently reducing the pressure as the extrudate advances, the temperature will be further controlled.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a side elevation of an extruder head of an elastomeric extrusion apparatus in accordance with the present invention:

FIG. 2 is a front elevation thereof;

FIG. 5 is a vertical, axial cross-section, taken along line 5—5 of FIG. 3;

FIG. 7 is a transverse cross-section, taken along line 7—7 of FIG. 5;

FIG. 8 is a fragmentary transverse cross-section, taken along line 8—8 of FIG. 5;

FIG. 9 is a fragmentary transverse cross-section, taken along line 9—9 of FIG. 5;

FIG. 10 is a fragmentary transverse cross-section, taken along line 10—10 of FIG. 5;

FIG. 11 is a fragmentary transverse cross-section, taken along line 11—11 of FIG. 5;

FIG. 12, which is on the same sheet of drawings as FIG. 5, is a fragmentary transverse cross-section, taken along line 12—12 of FIG. 5; and FIG. 13, which is on the same sheet of drawings as FIG. 5, is a fragmentary transverse cross-section, taken along line 13—13 of FIG. 5.

DESCRIPTION OF THE PREFERRED EMBODIMENTS

Figures 3, 4:
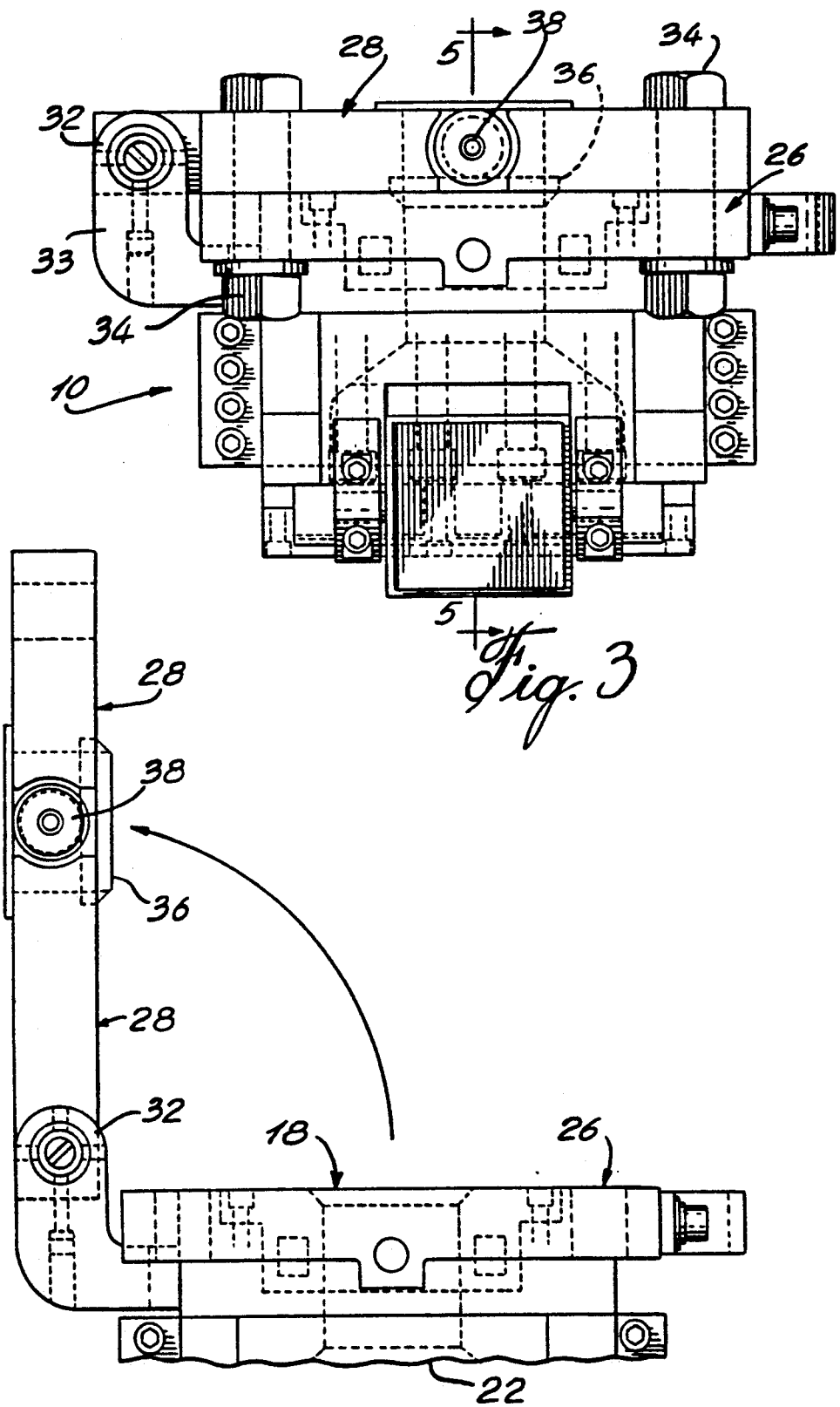
FIG. 3 is a top plan view thereof.
FIG. 4 is a fragmentary top plan view showing a detail in a different operative position.

Referring now to FIGS. 1 to 3, the extruder head 10 is shown with an upstream end 12 which can be connected to the remainder of the extruder apparatus, including a feed screw for feeding an elastomeric molten mass into the inlet port 20 shown in FIG. 1. The head 10 provides an extrusion passage or flow path for the elastomeric melt to the downstream end 14 where a die provides the final cross-sectional shape of the elastomeric extrudate. As will be described in relation to FIG. 5, there is a pressure transition chamber 18 which includes the inlet port 20, the extruder passage 22, and the orifice 24. This extruder passage 22 follows an axis through the head 10 about which the various elements will be constructed to form the passage 22.

The head 10, as shown in FIGS. 1 to 3 and 5, includes a plate 26 which defines a seat 27 to receive a tubular insert 40 which will be described later. The plate 26 includes a hinge bracket 33 to which plate 28 is hinged at 32. Plate 28 is normally closed against the plate 26 and is held in that position by means of bolt and nut arrangements 34. Plate 28 defines the passage 22 and the inlet port 20 and includes a bore 30 through which a probe 38 can be located. The probe 38 is operative to record the pressure and temperature of the elastomeric melt as it enters the passage 22 at the inlet port 20 immediately downstream of the feed screw (not shown).

A filter 36 will also be located in the passage 22 and held in a seat provided in the plate 28. The purpose of hinging the plate 28 to the plate 26 by means of hinge 32 is to allow easier access to the filter 36 which must be changed from time to time.

Figure 5A:
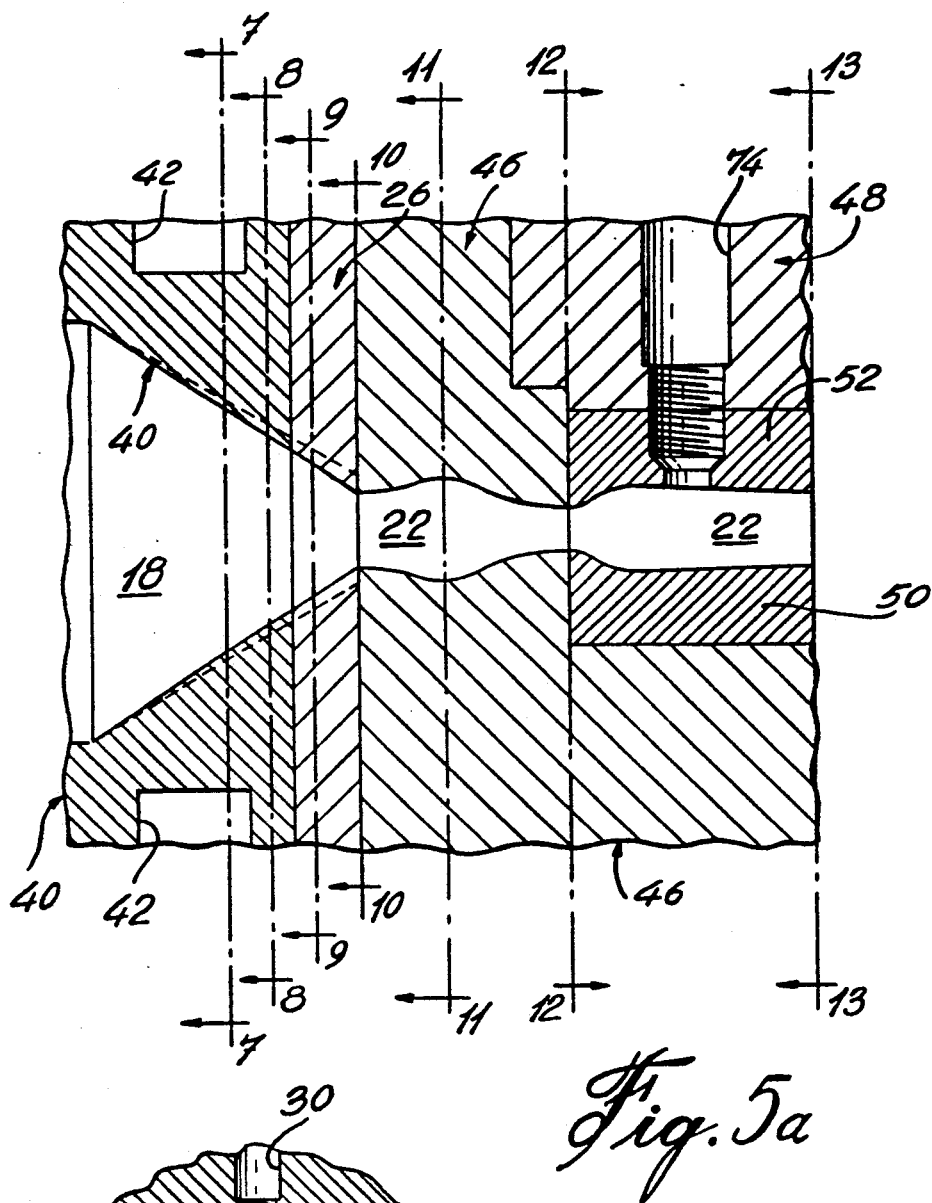
FIG. 5a is an enlarged fragmentary vertical, axial cross-section showing details of FIG. 5.

An important part of the extruder head 10 construction is the tubular insert 40 shown in FIG. 5. The extruder head 10 is provided with a cooling liquid chamber 42 which communicates with conduits 44 in the plate 26. The configuration of the insert 40 is shown more clearly in FIGS. 7 and 8. As can be seen from these FIGS., the passage 22 is gradually constricted and changes in cross-sectional outline from the shape of the passage 22 in FIG. 6, for instance. The material forming the insert 40 can be of a hard steel composition, such as a 4340 alloy steel. The portion forming the periphery of the cooling chamber could be, for instance, a separate cylindrical ring 40a for ease of fabrication. The downstream end of the plate 26 is illustrated in FIG. 10. Both FIGS. 9 and 10 show successive outlines of passage 22 in its progressively reduced cross-sectional area.

Downstream of the plate 26 there is provided a pair of interlocking blocks, namely, lower block 46 and upper block 48. The lower block 46 has a portion which extends above the axis of the passage 22 and defines a portion of the passage as will be seen more clearly in FIG. 11. It is noted that the cross-sectional area of the passage 22 taken along line 11—11 in FIG. 5 is of a greater cross-sectional area than its preceding upstream section, as shown in FIG. 10. Both the lower block 46 and upper block 48 are bolted together and are bolted against plate 26. Inserts 50 and 52 are held by the blocks 46 and 48 and define a further portion of the passage 22, and the outline of the passage at that point is best shown in FIG. 12. In fact, FIG. 12 is taken at the interface between the inserts 50 and 52 and the lower block 46. The passage at this point is again restricted, and the passage 22 is seen to expand in between the inserts 50 and 52. The final shape of the strip of elastomeric extrudate will be formed by the die plate 54 at the downstream end of the head 10. A probe bore 74 is provided in the upper block 48 and passes through insert 52. A probe, not shown, will be located in the bore 74 to record the downstream pressure and temperature of the elastomeric extrudate.

The die plate 54 which is readily replaced is held by means of sliding wedges 56 and 58 held by wedge brackets 60 and 62 bolted to the respective lower block 46 and upper block 48. The wedges are operated by reciprocation means, such as piston and cylinder arrangements 68 and 70 which are located in brackets 64 and 66 respectively. The brackets 60, 62 and the cylinders 68, 70 are best seen in FIGS. 1 and 2. Blocks 46 and 48 can be mounted to plate 26 by means of bolts 72 shown in FIG. 2.

As can be seen by the construction described and illustrated, the extruder head 10 is structured like a puzzle, including inserts to form portions of the extrusion passage. Thus, these inserts can be readily machined to fine-tune the configuration of the extrudate. Elastomeric material is well known to be unpredictable, i.e., a non-Newtonian fluid, and considerable fine-tuning of a new head is required to provide a proper extrudate profile.

Figure 6:
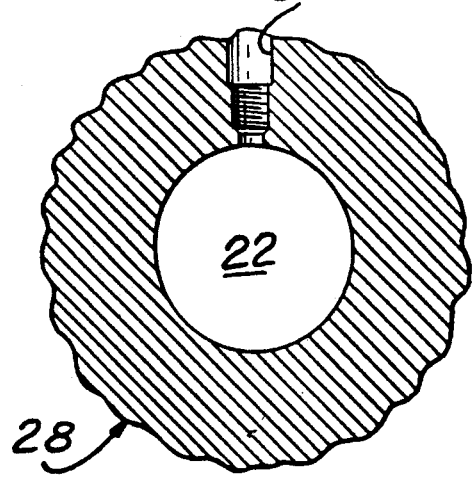
FIG. 6 is a fragmentary transverse cross-section, taken along line 6—6 of FIG. 5.

As can be seen from the flow path of the elastomeric melt, the melt is subjected to considerable pressure and thus temperature within the extrusion head. The melt enters the head 10 at port 20 having a cross-section as shown in FIG. 6, and then is forced to pass through constricting portions of the passage 22 as illustrated in FIGS. 7, 8 and 9. In a portion in the area of the cross-section of the passage 22 at FIG. 10, the pressure increases to 1400 p.s.i. (in one example). Immediately downstream of FIG. 10, the cross-sectional area of the passage is suddenly expanded to allow the elastomeric melt to expand and thus reduce the pressure to 900 p.s.i. in the zone represented by FIG. 11. As the extrudate is advanced, the passage is again constricted, and the pressure might increase in the area of FIG. 12 to 1100 p.s.i. in the same example.

As is well known, elastomeric material, such as rubber, has a narrow temperature range in which the melt can be properly extruded. It is known that above 250° F., elastomeric material begins to cure. Below 210° F., the molten material will begin to harden. It is preferable to maintain the temperature of the melt between 210° and 236° F. for optimum quality of the extrudate. Thus, it is important to have cooling chambers surrounding the passage 22 at critical points, such as shown in FIG. 5. It has also been found by providing the intermittent expansion portions in the passage 22, such as in the area of FIG. 11 and downstream of FIG. 12, that a sudden reduction of pressure will help to control the temperature and keep it within the preferred range. The operator of the extrusion process can monitor these criteria by means of probes 38 and the probe in probe bore 74.

A further advantage of the construction of the extrusion head of the present invention is the possibility of utilizing separable and replaceable inserts which make up parts of the extrusion passage 22. These inserts can be replaced if worn, and different steel hardnesses can be used for different parts of the head 10. Thus, when plates 26 and 28 are considered, the hardness can be less than for the insert 40 which is at a critical part of the passage 22. Likewise, the hardness of lower block 46 may be greater than the upper block 48 which does not have any portion thereof in contact with the passage.

The resulting extrusion head 10 provides a much smaller and lighter construction suitable for elastomeric material extrusion.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

We claim:

1. An extruder head construction comprising a first section containing segments formed by at least two plates having openings defining an extrudate passage and the plates extending at right angles to the longitudinal axis of the passage, locking means extending through the plates to fix the plates together, a second section including an extrudate passage forming insert defining an axial portion of the extrudate passage comprising a tubular member and a flange formed at one end of the tubular member wherein the flange is retained between the plates of the first section to maintain the tubular member concentric with the longitudinal axis of the extrudate passage, the insert including a cooling liquid chamber communicating with conduits in at least one of the plates making up the first section, the conduits communicating with a source of cooling liquid to cool a wall of the insert forming the extrudate passage, a third section including at least a pair of block members mated together and secured to the first section and defining a bore co-extensive with the longitudinal axis of the extrudate passage, a tubular insert provided in at least a portion of the bore to form an extension of the extrudate passage downstream of the first section, and a movable die assembly attached to the third section.

2. An extruder head as defined in claim 1, wherein there are at least two portions in the passage which have a cross-sectional area greater than the immediately upstream portion so as to provide at least two spaced-apart expansion portions in the passage allowing the pressure of the elastomeric melt to be intermittently decreased.

3. An extruder head as defined in claim 1, wherein the plates in the first section include one plate hingedly mounted to the other plate such that it can swing away from the plate in order to access the extrudate passage and to be able to insert a filter in the passage and to access the insert forming the second section.

4. An extruder head as defined in claim 3, wherein the third section includes a lower block and an upper block with a portion of the lower block extending on the longitudinal axis of the passage and defining a portion of the passage.

5. An extruder head as defined in claim 4, wherein a portion of the passage downstream from the portion defined in the lower block is formed by said tubular inserting the third section, which in turn is made up of at least two separable parts with one part seated in the lower block and the other seated in the upper block.

* * * * *